(12) United States Patent
Carlson et al.

(10) Patent No.: US 9,493,670 B2
(45) Date of Patent: Nov. 15, 2016

(54) COATINGS THAT PROVIDE HYDROPHILIC SURFACE (71) Applicant: EMPIRE TECHNOLOGY DEVELOPMENT LLC, Wilmington, DE (US)

(72) Inventors: William Brenden Carlson, Seattle, WA (US); Gregory D. Phelan, Cortland, NY (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/785,477

(22) PCT Filed: Apr. 18, 2013

(86) PCT No.: PCT/US2013/037123
§ 371 (c)(1),
(2) Date: Oct. 19, 2015

(87) PCT Pub. No.: WO2014/171943
PCT Pub. Date: Oct. 23, 2014

(65) Prior Publication Data
US 2016/0075906 A1  Mar. 17, 2016

(51) Int. Cl.
*C09D 133/14* (2006.01)
*C09D 133/04* (2006.01)
*C09D 175/04* (2006.01)

(52) U.S. Cl.
CPC ........... *C09D 133/04* (2013.01); *C09D 175/04* (2013.01)

(58) Field of Classification Search
CPC .................................................. C09D 133/14

USPC ........................................... 427/331; 524/548
See application file for complete search history.

(56) References Cited

U.S. PATENT DOCUMENTS

| 3,403,128 | A |   | 9/1968  | Berndt et al. |
| 4,554,346 | A |   | 11/1985 | Gaku et al. |
| 4,617,253 | A | * | 10/1986 | Taylor .................... G03F 7/038 |
|           |   |   |         | 427/553 |
| 4,894,414 | A |   | 1/1990  | Yang et al. |
| 5,157,074 | A |   | 10/1992 | Metzger et al. |
| 6,437,040 | B2 |  | 8/2002  | Anthony et al. |
| 6,723,815 | B2 | * | 4/2004 | Callaghan ............... A61L 27/34 |
|           |   |   |         | 526/303.1 |

(Continued)

FOREIGN PATENT DOCUMENTS

GB          759860  A      10/1956

OTHER PUBLICATIONS

Regulski and Thomas (ACS Organic Coatings & Applied Polymers Science Proceedings, vol. 48, pp. 1003-1007, 1983).*

(Continued)

*Primary Examiner* — Vu A Nguyen
(74) *Attorney, Agent, or Firm* — Pepper Hamilton LLP (57) ABSTRACT

Hydrophilic coating compositions and methods to make and use the compositions are disclosed. The compositions include a polymer comprising one or more cyanate groups and a blocking agent contacting at least one of one or more cyanate groups. When exposed to atmospheric water, the blocked cyanate moieties at the surface may hydrolyze to expose hydrophilic groups. Thus, the hydrophobic polymeric surface may change to a hydrophilic surface upon reacting with atmospheric water and moisture.

29 Claims, 4 Drawing Sheets

(56) References Cited

U.S. PATENT DOCUMENTS

| | | | |
|---|---|---|---|
| 7,157,538 B2 * | 1/2007 | Callaghan | A61L 27/34 |
| | | | 525/330.5 |
| 7,354,624 B2 | 4/2008 | Millero et al. | |
| 2004/0059079 A1 | 3/2004 | Vilasagar et al. | |
| 2004/0067318 A1 * | 4/2004 | Jones | C08G 18/807 |
| | | | 427/402 |
| 2005/0123781 A1 | 6/2005 | Drescher et al. | |
| 2008/0012124 A1 | 1/2008 | Stapleton et al. | |
| 2010/0243221 A1 | 9/2010 | Yamasaki et al. | |
| 2013/0023640 A1 | 1/2013 | Ikeno et al. | |

OTHER PUBLICATIONS

International Search Report for International Application No. PCT/US2013/037123 mailed Aug. 16, 2013.

* cited by examiner

COATINGS THAT PROVIDE HYDROPHILIC SURFACE

CLAIM OF PRIORITY

This application is a U.S. national stage filing under 35 U.S.C. §371 of International Application No. PCT/US2013/037123 filed Apr. 18, 2013 entitled "COATINGS THAT PROVIDE HYDROPHILIC SURFACE," which is incorporated herein by reference in its entirety.

BACKGROUND

Coatings and paints are routinely used to beautify and protect substrates. The most simple coatings and paints are made of a polymer (the binder) in a solvent (the vehicle), which is commonly called a lacquer. Paints and coatings modify the appearance of an object by adding color, gloss, or texture, and by blending with or differentiating from a surrounding environment. For example, a surface that is highly light scattering (that is, a flat surface) can be made glossy by the application of a paint that has a high gloss. Conversely, a glossy surface can be made to appear flat. Thus, the painted surface is hidden, altered, and ultimately changed in some manner by the presence of the coating. In addition, paints also protect the surface from the surrounding elements and prevent or reduce the corrosive process.

Paints and coatings, while protecting the substrate from the surrounding environment, can themselves get dirty. The dirt can dull the coating by increasing the light scattering or by modifying the color of the coating. The dirt can also affect the durability of a paint. There remains a need to develop coatings with hydrophilic surface and self-cleaning properties. A hydrophilic surface would allow water to spread out in a thin pool, sweeping dirt off the surface as the water puddles or thins out and trickles away. This type of "self-cleaning" behavior is advantageous to an exterior paint, as it keeps the coating clean without requiring extensive cleaning by the customer. A hydrophilic surface would allow water to sheathe over the surface and either solvate or even carry away the dirt molecules.

SUMMARY

The present disclosure provides paints and coatings that provide a hydrophilic, self-cleaning surface when coated on an object, while maintaining a protective hydrophobic interior or bulk of the coating. The current work also allows for the hydrophilic surface properties to be renewed as the coating wears. In one embodiment, a coating composition may be at least one polymer comprising one or more cyanate groups, and at least one blocking agent contacting at least one of the one or more cyanate groups. The at least one blocking agent may be configured to be removed by a stimulus to switch a portion of the coating composition that is exposed to the stimulus from a hydrophobic state to a hydrophilic state.

In an additional embodiment, a method for preparing a coating composition may include: contacting a cyanato ester with a blocking agent to form an ester monomer; polymerizing the ester monomer to form a binder; and preparing the coating composition with the binder, wherein the blocking agent is configured to be removed by a stimulus to switch a portion of the coating composition that is exposed to the stimulus from a hydrophobic state to a hydrophilic state.

In another embodiment, a method of coating a substrate may include applying a coating composition to the substrate, wherein the coating composition comprises at least one polymer comprising one or more cyanate groups, and at least one blocking agent contacting at least one of the one or more cyanate groups. The at least one blocking agent may be configured to be removed by a stimulus to switch a portion of the coating composition that is exposed to the stimulus from a hydrophobic state to a hydrophilic state.

In a further embodiment, an article of manufacture may be a coating covering at least a portion of the article, wherein the coating comprises at least one polymer comprising one or more cyanate groups, and at least one blocking agent contacting at least one of the one or more cyanate groups. The at least one blocking agent is configured to be removed by a stimulus to switch a portion of the coating that is exposed to the stimulus from a hydrophobic state to a hydrophilic state.

DETAILED DESCRIPTION

This disclosure is not limited to the particular systems, devices and methods described, as these may vary. The terminology used in the description is for the purpose of describing the particular versions or embodiments only, and is not intended to limit the scope.

The present disclosure identifies methods and compositions for paints and coatings that provide a hydrophilic, self-cleaning surface when coated on a substrate. In some embodiments, a coating composition may include at least one polymer having one or more cyanate groups, and at least one blocking agent contacting at least one of the one or more cyanate groups. The blocking agent may be configured to be removed by a stimulus to switch a portion of the coating composition that is exposed to the stimulus from a hydrophobic state to a hydrophilic state. In some embodiments, the cyanate groups may cross-link the polymer. In some embodiments, the coating composition may comprise a monomer with blocked cyanate functional groups.

In some embodiments, the polymer with cyanate functional groups may be a polymer or a copolymer of an acrylate, a vinyl, a styrene, or any combination thereof. Non-limiting examples include, but are not limited to, polymers of monomeric units of one or more of the following: 2-hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate, 5-hydroxydecyl methacrylate, hydroxyethylcaprolactone acrylate, hydroxyethylcaprolactone methacrylate, hydroxypropylcarbamate acrylate, and 2-hydroxy-3-phenoxypropyl acrylate, styrene, 2-vinylpyridine, 4-vinylpyridine, 2-vinylphenol, 4-vinylphenol, alpha-methylstyrene, vinyl acetate, vinyl propionate, vinyl butyrate, vinyl alcohol, vinyl chloride, vinyl fluoride, vinyl bromide, vinylidene chloride, vinylidene fluoride, methyl vinyl ether, ethyl vinyl ether, ethylene, propylene, butylene, methyl methacrylate, butyl methacrylate, methyl acrylate, butyl acrylate, hexyl methacrylate, hexyl acrylate, and any combination thereof.

Figure 1:
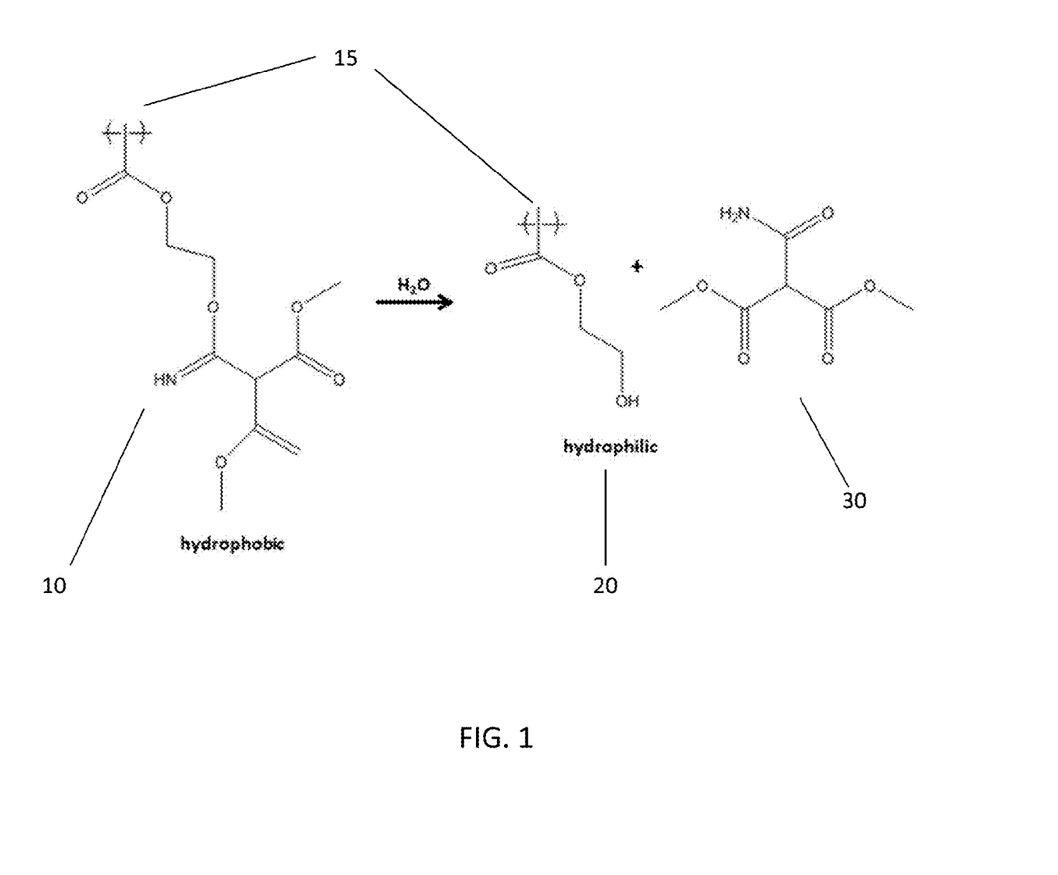
FIG. 1 depicts hydrolysis of the blocking agent to form hydrophilic hydroxyl groups according to an embodiment.

In some embodiments, the cyanate groups of the polymer may be blocked with one or more blocking agents. The blocking agent may impart hydrophobicity to the polymer. However, when exposed to atmospheric water, the blocked cyanate moieties at a surface of the coating composition hydrolyze to expose hydrophilic hydroxyl groups. For example, as shown in FIG. 1, a hydrophobic blocked cyanate moiety 10 along a polymer backbone 15, when exposed to water, results in hydrophilic 2-hydroxyethyl pendent moieties 20 along the polymer backbone 15 and a dissociated blocking agent moiety 30, which can be easily washed away. Thus, the hydrophobic polymeric surface may change to a hydrophilic surface upon reacting with atmospheric water or moisture. In some embodiments, the stimulus may also be air, gas, light, sunlight, heat, or any combination thereof that aids in converting a hydrophobic polymeric surface to a hydrophilic surface.

Examples of blocking agents that may be used include, but are not limited to, imidazoles, pyrroles, pyrrolidines, morpholines, pyridines, piperidines, alkyl malonate esters, acetoacetic esters, cyanoacetic esters, caprolactams, oximes, or any combination thereof. In some embodiments, blocking agents such as dimethyl malonate or 4-methylimidazole may be used.

In additional embodiments, the coating composition may further contain one or more additives. These additives may alter properties of the paint made from the coating composition, such as shelf life, application, longevity, and health and safety. Such additives may be added, for example, during the manufacture of emulsion polymers in the paint or during the formulation of the paint itself. Illustrative additives may include initiators, rheology modifiers, preservatives, and the like. Initiators are a source of free radicals to initiate the polymerization process in which monomers form polymers. Coating compositions may contain a redox system initiator, such as ferrous, thiosulfate, or persulfate salts, that promote polymerization at room temperature.

In some embodiments, thickeners and rheology modifiers may also be added to coating compositions to achieve desired viscosity and flow properties. Thickeners function by forming hydrogen bonds, resulting in chain extension and higher molecular weight when not under shear, thereby causing large increase in viscosity. Under shear, the hydrogen bonds "break" resulting in a sudden lowering in molecular weight and reduction in viscosity. Thickeners, such as cellulose derivatives including hydroxyethyl cellulose, methyl cellulose or carboxymethyl cellulose, may be used in the coating compositions.

In some embodiments, one or more preservatives may be added in the coating compositions in low doses to protect against the growth of microorganisms. Preservatives, such as methyl benzisothiazolinones, chloromethylisothiazolinones, barium metaborate or 1-(3-chloroallyl)-3,5,7-triaza-1-azoniaadamantane chloride, may be used.

In some embodiments, the coating composition may further contain one or more of the following additives: solvents, pigments, plasticizers, surfactants, crosslinking agents, and the like. Surfactants may be used, for example, to create the micelles for particle formation, as well as long-term particle stabilization. Surfactants may provide stability through electrostatic and steric hindrance mechanisms. Both ionic and non-ionic surfactants may be used. Examples may include, but are not limited to, alkyl phenol ethoxylates, sodium lauryl sulfate, dodecylbenzene sulfonate, polyoxyethylene alkyl ethers, polyoxyethylene alkyl allyl ethers, acetylene glycols, polyoxyethylene, stearic acid and polyoxypropylene.

Coalescing agents, such as ester alcohols, benzoate ethers, glycol ethers, glycol ether esters and n-methyl-2-pyrrolidone, may be added to the coating compositions. Coalescing agents may be added to, for example, insure film formation under varying atmospheric conditions. They may be slow evaporating solvents with some solubility in the polymer phase. Coalescing agents may also act as a temporary plasticizer, allowing film formation at temperatures below the glass transition temperature of the system. After film formation, the coalescing agents may slowly diffuse to the surface and evaporate, increasing the hardness and block resistance of the film.

In some embodiments, one or more plasticizers may be added to the compositions to adjust the tensile properties of the paint film. Plasticizers may include, for example, a glucose-based derivative, a glycerine-based derivative, propylene glycol, ethylene glycol, phthalates and the like.

The coating composition, according to some embodiments, may further comprise one or more pigments. The term "pigments" is intended to embrace, without limitation, pigmentary compounds employed as colorants, including white pigments, as well as ingredients commonly known in the art as "opacifying agents" and "fillers". Pigments may be any particulate organic or inorganic compound and may provide coatings with the ability to obscure a background of contrasting color (hiding power).

In some embodiments, one or more crosslinking agents, such as melamine, glycidyl methacrylate, 1-isocyanato-4-vinyl-benzene, 1-cyanato-4-vinyl-benzene, allyl methacrylate, vinyl methacrylate, 2-thioethyl methacrylate, cyanato-ethene, divinyl benzene, ethylene glycol dimethacrylate, propylene glycol dimethacrylate, polyethylene glycol dimethacrylate, toluene diisocyanate, 4,4'-methylenebis(phenyl isocyanate), isophorone diisocyanate, hexamethylene diisocyanate, or melamine formaldehyde may be used in the coating compositions. In addition, diols such as ethylene glycol, glycerol, propylene glycol, hexamethylenediol, and diamines such as diethyl amine, hexamethylenediamine, and dithiols may also be used.

The coating compositions, according to some embodiments, may also comprise extenders or fillers which serve, for example, to thicken coating films and support the structure of the coating composition. Some extenders may also provide hiding power and function as pigments, particularly above the critical pigment volume concentration, and most extenders are color neutral. Common extenders include, for example, clays such as kaolin clays, china clays, talcs, quartz, barytes (barium sulphate) and carbonate salts, such as calcium carbonate, zinc carbonate, magnesium carbonate or mixtures thereof.

Figure 2:
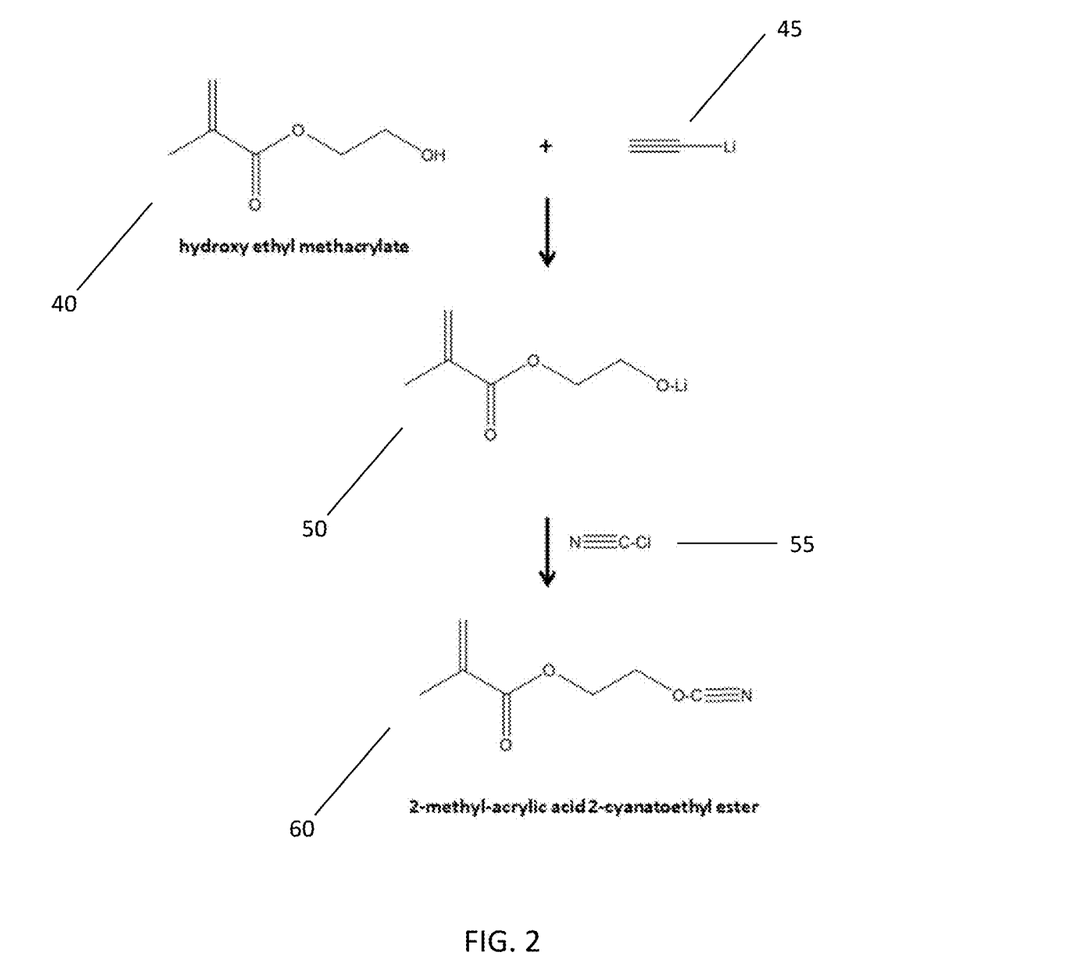
FIG. 2 illustrates formation of a cyanato ester according to an embodiment.
Figure 3:
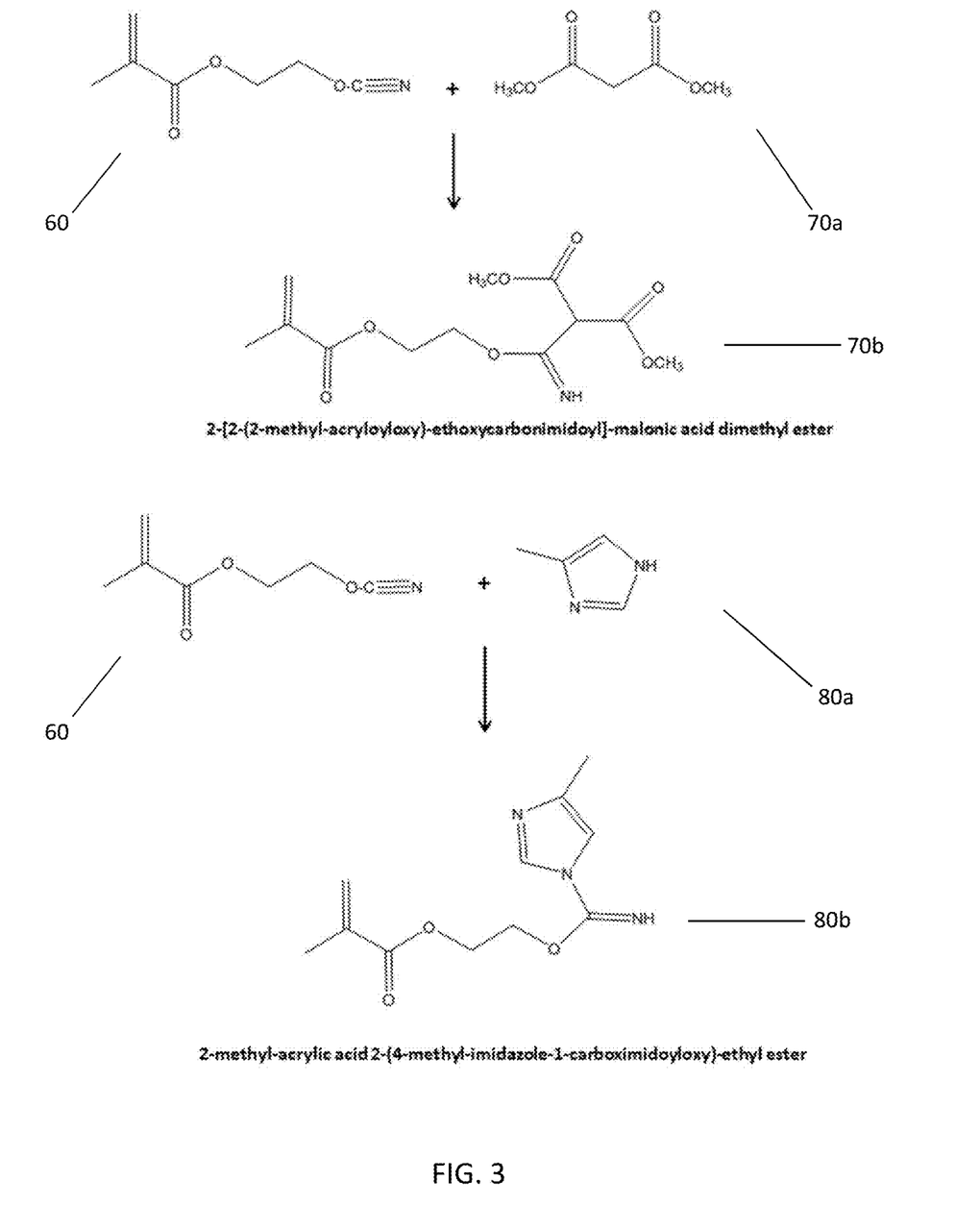
FIG. 3 shows synthesis of capped cyanato esters according to embodiments.

In some embodiments, a method of preparing a coating may include: modifying a hydroxy-functional compound to form the cyanato ester; contacting a cyanato ester with a blocking agent to form an ester monomer; polymerizing the ester monomer to form a binder; and preparing the coating composition with the binder. Synthesis of a cyanato ester and blocked cyanato esters are illustrated in FIGS. 2 and 3. As shown in FIG. 2, a hydroxy-functional compound 40 is contacted with a base 45 to form an intermediate compound 50. The intermediate compound 50 is then contacted with a cyanogen halide 55 to form a cyanato ester 60. FIG. 3 shows exemplary reactions to form blocked cyanato esters from a cyanato ester 60. The cyanato ester 60 can react with a blocking agent such as a dimethyl malonate 70a to form the blocked cyanato ester, 2-[2-(2-methyl-acryloyloxy)-ethoxy-carbonimidoyl]-malonic acid dimethyl ester 70b. Alternatively, the cyanato ester 60 can react with a blocking agent such as a methylimidazole 80a to form the blocked cyanato ester, 2-methyl-acrylic acid 2-(4-methyl-imidazole-1-carboximidoyloxy)-ethyl ester 80b.

In some embodiments, the hydroxy-functional compounds may be acrylate compounds where the hydroxyl group is present in the alcoholic portion of the acrylate. Such esters are commercially available and/or can be readily synthesized, for example, from acrylic acid and a respective diol or hydroxy-functional epoxide. Commercially available esters include the hydroxyalkyl acrylates or hydroxyalkyl methacrylates, where the alkyl group contains 2 to 10 carbon atoms, or 2 to 4 carbon atoms. Examples of suitable hydroxyalkyl acrylates and methacrylates include 2-hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate, and 5-hydroxydecyl methacrylate. In some embodiments, the hydroxy-functional derivatives of the following compounds may also be used: hydroxyethyl-caprolactone acrylate, hydroxyethylcaprolactone methacrylate, hydroxypropylcarbamate acrylate, 2-hydroxy-3-phenoxypropyl acrylate, styrene, 2-vinylpyridine, 4-vinylpyridine, 2-vinylphenol, 4-vinylphenol, alpha-methylstyrene, vinyl acetate, vinyl propionate, vinyl butyrate, vinyl alcohol, vinyl chloride, vinyl fluoride, vinyl bromide, vinylidene chloride, vinylidene fluoride, methyl vinyl ether, ethyl vinyl ether, ethylene, propylene, butylene, methyl methacrylate, methyl acrylate, butyl methacrylate, butyl acrylate, hexyl methacrylate, hexyl acrylate, or any derivatives of the foregoing, or any combinations thereof.

In some embodiments, modifying a hydroxy-functional compound may involve contacting the hydroxy-functional compound with a base to form an intermediate compound. Suitable bases include, but are not limited to, lithium acetylide, butyl lithium, phenyl lithium, lithium phenylacetylide, dry hydroxide, triethyl amine, pyridine, imidazole, 1,5,7-triazabicyclo[4.4.0]dec-5-ene, quinuclidine, 1,4-diazabicyclo[2.2.2]octane, or any combination thereof. The hydroxy-functional compound and the base may be contacted for about 1 hour to about 4 hours, about 1 hour to about 3 hours, or about 1 hour to about 2 hours. Specific examples include about 1 hour, about 2 hours, about 3 hours, about 4 hours, and ranges between (and including the endpoints) any two of these values. The hydroxy-functional compound and the base may be contacted at a temperature of about 0° C. to about 10° C., about 0° C. to about 8° C., about 0° C. to about 6° C., or about 0° C. to about 4° C. Specific examples include about 0° C., about 2° C., about 4° C., about 6° C., about 8° C., about 10° C., and ranges between (and including the endpoints) any two of these values.

In some embodiments, the intermediate compound may be contacted with a cyanogen halide to form a cyanato ester. Examples of cyanogen halides include, but are not limited to, cyanogen bromide and cyanogen chloride. The intermediate compound and the cyanogen halide may be contacted for about 2 hours to about 15 hours, about 2 hours to about 10 hours, about 2 hours to about 7 hours, or about 2 hours to about 4 hours. Specific examples include about 2 hours, about 4 hours, about 6 hours, about 8 hours, about 12 hours, about 15 hours, and ranges between (and including the endpoints) any two of these values. In some embodiments, the intermediate compound and the cyanogen halide may be contacted at a temperature of about 20° C. to about 30° C., about 20° C. to about 28° C., about 20° C. to about 25° C., or about 20° C. to about 22° C. Specific examples include about include about 20° C., about 22° C., about 24° C., about 26° C., about 28° C., about 30° C., and ranges between (and including the endpoints) any two of these values.

In some embodiments, the cyanato ester is mixed with a cold solution of blocking agent in a molar ratio of about 1:0.5 to about 1:1.5, about 1:0.5 to about 1:1.25, about 1:0.5 to about 1:1, about 1:0.5 to about 1:0.975, or about 1:0.5 to about 1:0.75. Specific examples include, for example, about 1:0.5, about 1:0.75, about 1:0.975, about 1:1, about 1:1.25, about 1:1.5 and ranges between (and including the endpoints) any two of these values. The mixing may be performed for about 1 hour, about 2 hours, about 3 hours, about 4 hours, about 5 hours, or about 6 hours. In some embodiments, the temperature of the reaction may be at room temperature, such as about 30° C., about 28° C., about 27° C., about 25° C., or about 20° C.

In some embodiments, a solvent such as tetrahydrofuran may be removed from the reaction mixture after the reaction process. In some embodiments, the ester monomer product may be de-colorized by passing the product through a de-coloring agent, such as activated carbon, alumina, sodium hypochlorite or the like. In some embodiments, the ester monomer may be further purified by distillation or by other methods known in the art. Illustrative examples of ester monomers with a blocked cyanate group include 2-[2-(2-methyl-acryloyloxy)-ethoxycarbonimidoyl]-malonic acid dimethyl ester and 2-methyl-acrylic acid 2-(4-methyl-imidazole-1-carboximidoyloxy)-ethyl ester.

The polymerization of the ester monomer may be performed by, for example, an emulsion polymerization process. This involves heating a mixture containing water, an initiator, and a surfactant, and adding the ester monomer dropwise to the mixture with constant stirring. The initiator/surfactant mixture and ester monomer are vigorously mixed to form micelles. The rate at which the monomer is added may be varied to obtain micelles of different sizes which influence film formation. In some embodiments, the mixture is heated to a temperature of about 50° C. to about 95° C., about 50° C. to about 80° C., or about 50° C. to about 70° C. Specific examples include about 50° C., about 60° C., about 70° C., about 74° C., about 80° C., about 95° C., and ranges between (and including the endpoints) any two of these values. The mixing process may be performed for about 1 hour to about 12 hours, about 1 hour to about 8 hours, about 1 hour to about 6 hours, or about 1 hour to about 4 hours. Specific examples include about 1 hour, about 2 hours, about 4 hours, about 6 hours, about 7 hours, about 8 hours, about 9 hours, about 12 hours, and ranges between (and including the endpoints) any two of these values. Some of the surfactants that may be used in the process are dodecyl sulfate, alkyl phenol ethoxylate, sodium lauryl sulfate, dodecylbenzene sulfonate, polyoxyethylene alkyl ethers, polyoxyethylene alkyl allyl ethers, acetylene glycols, polyoxyethylene, polyoxypropylene or any combination thereof. Examples of initiators that may be used include, but are not limited to, benzoyl peroxide, persulfates, water soluble azo initiators, water soluble peroxides, a persulfate redox systems or any combination thereof. The resulting product is an emulsion containing polymer particles suspended in water. Various additives such as, for example, pigments, coalescing agents, rheology modifiers, fungicide, plasticizers, nitrates and the like that are described herein may be added. When the coating is applied on a substrate, the water evaporates and the polymer particles of the emulsion coalesce to form a solid film.

The present disclosure relates to hydrophilic coating compositions, which when applied to a substrate dried and/or cured, result in a hydrophilic coating. A hydrophilic coating composition may be a liquid hydrophilic coating composition, such as a solution or a dispersion comprising a liquid medium. Any liquid medium that allows application of the hydrophilic coating formulation on a surface may suffice. Examples of liquid media are alcohols, like methanol, ethanol, propanol, butanol or respective isomers and aqueous mixtures thereof, acetone, methylethyl ketone, tetrahydrofuran, butyl acetate, 1,1,1,-trichloroethane, dichloromethane, toluene, and aqueous mixtures or emulsions thereof or water. The coating compositions of the present disclosure may also be a latex emulsion, non-aqueous dispersion, or powder. The hydrophilic coating composition may further comprise components that when cured are converted into the hydrophilic coating, and thus remain in the hydrophilic coating after curing. As used herein, curing refers to physical or chemical hardening or solidifying by any method, for example heating, cooling, drying, crystallizing, or curing as a result of a chemical reaction, such as radiation-curing or heat-curing. In the cured state, all or a portion of the components in the hydrophilic coating formulation may be cross-linked forming covalent linkages between all or a portion of the components, for example by using UV or electron beam radiation. In addition, in the cured state, all or a portion of the components may be ionically bonded, bonded by dipole-dipole type interactions, or bonded via Van der Waals forces or hydrogen bonds.

To apply the hydrophilic coating on the substrate, a primer coating may be used in order to provide a binding between the hydrophilic coating and the substrate. In some instances, the primer coating facilitates adhesion of the hydrophilic coating to the substrate. The binding between the primer coating and the hydrophilic coating may occur due to covalent or ionic links, hydrogen bonding, or polymer entanglements. These primer coatings may be solvent-based, water-based (latexes or emulsions) or solvent-free and may comprise linear, branched and/or cross-linked components. Typical binders in primer coatings that could be used include, for example, polyether sulfones, polyurethanes, polyesters, polyacrylates, polyamides, polyethers, polyolefins, and copolymers thereof. The hydrophilic coatings of the present disclosure can also be applied on the substrate without a primer.

The coatings may be used as a decorative coating, an industrial coating, a protective coating, a UV-protective coating, a self-cleaning coating, a biocidal coating, or any combination thereof. The coatings may generally be applied to any substrate. The coated substrate may be an article, an object, a vehicle or a structure. Although no particular limitation is imposed on the substrate to be used in the present disclosure, exemplary substrates include an exterior of a building, vehicles, bridges, airplanes, metal railings, fences, glasses, plastics, metals, ceramics, wood, stones, cement, fabric, paper, leather, walls, pipes, vessels, medical devices, and the like. The coating may be applied to a substrate by spraying, dipping, rolling, brushing, or any combination thereof.

Figure 4:
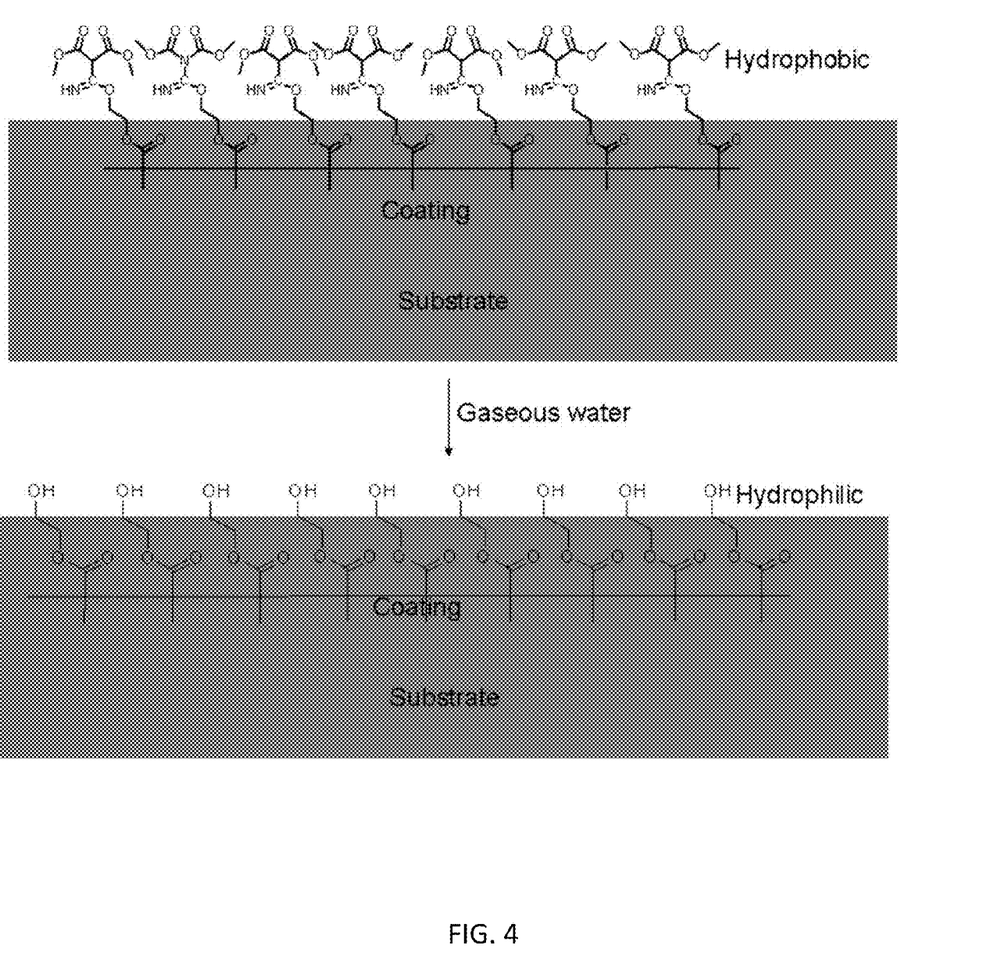
FIG. 4 illustrates the coating of a surface with a paint composition containing blocked cyanate groups according to an embodiment.

An example coating embodiment is illustrated in FIG. 4. The film surface is hydrophobic in nature, but when exposed to atmospheric water it quickly loses its blocking moieties due to hydrolysis. The removal of the blocking moieties results in a surface with hydroxyl groups, which are hydrophilic. As the surface of the film is worn further, more hydroxyl groups are formed. Thus, the hydrophilic nature of the film's surface is renewed while the bulk of the film remains hydrophobic to protect the surface from atmospheric moisture. The coatings can make it easier to clean objects and to preserve their original appearance, and can protect them from corrosion.

EXAMPLES

Example 1

Preparation of a Cyanate Ester

About 900 mL of freshly distilled tetrahydrofuran (THF) is mixed with 100 mL of anhydrous 2-hydroxyethyl methacrylate in a three neck 2 L round bottom flask equipped with an argon inlet, a stir bar, and an addition funnel. The flask is cooled on a dry ice/acetone bath. About 515 mL of butyl lithium solution is added to the flask over a period of 3 hours while maintaining the flask on dry ice coolant. After this addition, about 275 mL of cyanogen bromide solution (3 M in $MeCl_2$) is added to the flask over a period of 90 minutes. The solution is allowed to warm to room temperature overnight. The contents are decanted and filtered under dry conditions to remove precipitated lithium bromide. The organic solvents are removed under reduced pressure and the remaining residue is vacuum distilled at 90° C. to yield 2-methyl-acrylic acid 2-cyanato-ethyl ester (90% yield).

Example 2

Preparation of an Ester Monomer with Blocked Cyanate Groups

A 10% solution of diethylmalonate is prepared using a freshly distilled THF. The solution is prepared under dry argon and is cooled to about 1-3° C. on an ice bath. To this solution, a small amount of quinuclidine is added as a catalyst. A solution of 2-methyl-acrylic acid 2-cyanato-ethyl ester is added drop wise (0.05 mL/2 seconds) to the THF/diethylmalonate solution. The molar ratio of the ester and diethylmalonate in the reaction is 0.975:1. The solution is stirred under dry argon for six hours, and the solution is slowly warmed to 20° C. The THF is then removed by rotary evaporation using a dry ice trap. The temperature of the bath is maintained below 27° C. at this step. A light yellow viscous liquid is obtained, and the liquid is de-colorized by adding activated carbon and filtering it. The resulting colorless clear liquid is then distilled under vacuum ($10^{-6}$ torr) to obtain 2-[2-(2-methyl-acryloyloxy)-ethoxycarbonimidoyl]-malonic acid dimethyl ester.

Example 3

Emulsion Polymerization

The reaction process has the following components: a pre-emulsion mix containing 470 grams of 2-[2-(2-methyl-acryloyloxy)-ethoxycarbonimidoyl]-malonic acid dimethyl ester, 3.36 grams of nonylphenol polyglycol ether, 0.66 grams of nonylphenol polyglycol ether sodium sulfate, 75.8 grams of water and 0.91 grams of lauryl mercaptan; and an initiator/surfactant mix containing 16.1 grams of nonylphenol polyglycol ether, 3.14 grams of nonylphenol polyglycol ether sodium sulfate, 1.34 grams of polyvinyl alcohol, 2.35 grams of sodium bicarbonate, 33.8 grams of tert-butyl hydroperoxide, 33.8 grams of formaldehyde sulphoxylate and 120.6 grams of water. The initiator/surfactant mix is pre-heated to a temperature of about 74° C. in a jacketed glass reactor, and the pre-emulsion mix is slowly added dropwise with constant mixing. The reaction temperature is slowly raised to 90° C., and the mixing is performed for 6 hours. The resulting emulsion is cooled.

Example 4

Emulsion Polymerization

The reaction process has the following components: a pre-emulsion mix containing 470 grams of 2-methyl-acrylic acid 2-(4-methyl-imidazole-1-carboximidoyloxy)-ethyl ester, 3.36 grams of nonylphenol polyglycol ether, 0.66 grams of nonylphenol polyglycol ether sodium sulfate, 75.8 grams of water and 0.91 grams of lauryl mercaptan; and an initiator/surfactant mix containing 16.1 grams of nonylphenol polyglycol ether, 3.14 grams of nonylphenol polyglycol ether sodium sulfate, 1.34 grams of polyvinyl alcohol, 2.35 grams of sodium bicarbonate, 33.8 grams of tert-butyl hydroperoxide, 33.8 grams of formaldehyde sulphoxylate and 120.6 grams of water. The initiator/surfactant mix is pre-heated to a temperature of about 74° C. in a jacketed glass reactor, and the pre-emulsion mix is slowly added dropwise with constant mixing. The reaction temperature is slowly raised to 90° C., and the mixing is performed for 6 hours. The resulting emulsion is cooled.

Example 5

Evaluation of Hydrophilic Property

The hydrophilic coating containing the emulsion from Example 3 is coated on a glass surface and dried in an oven at 100° C. for 10 minutes. The coated glass surface is exposed to moisture for 1 hour and the surface free energy and the water droplet contact angle of the hydrophilic coating are measured as follows. A Zisman plotting method is employed for measuring surface free energy. The surface tension of various concentrations of an aqueous solution of magnesium chloride is plotted along the X-axis, and the contact angle in terms of cos θ is plotted along the Y-axis. A graph with a linear relationship between the two is obtained. The graph is extrapolated such that the surface tension at contact angle 0° is measured and is defined as the surface free energy of the coated glass surface. The surface free energy of the glass surface will be 85 milliNewtons/meter. This high surface energy is indicative of the hydrophilic property of the coating.

Example 6

Evaluation of Hydrophilic Coating

The hydrophilic coating containing the emulsion from Example 3 is coated on a glass substrate and dried in an oven at 100° C. for 10 minutes. The glass substrate is exposed to moisture for 1 hour and evaluated for the following properties.

Hydrophilicity: The water droplet contact angle in air is measured by using DropMaster 500 (Kyowa Interface Science Co., Ltd). The water droplet contact angle measured will be 8°. This low water droplet contact angle is indicative of the hydrophilic property of the coating.

Water resistance and Durability: The hydrophilic coating is subjected to a rubbing treatment with sponge in 10 reciprocations in water while applying a load of 1 kg. The amount of residual film is calculated from a change of weight before and after the rubbing treatment. The weight of the film after rubbing treatment will be 97% of the initial weight.

Weather resistance: The hydrophilic coating is exposed in a chamber to a xenon arc lamp that is calibrated to mimic the spectral characteristics of the sun (Atlas Sun Test). The exposure is performed for 500 hours and evaluated with respect to hydrophilicity, water resistance and durability. The hydrophilic coating will exhibit the same properties before and after the exposure.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases one or more or at least one and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art (for example copolymerizing other monomers with the blocked HEMA or substituting various blocking agents), each of which is also intended to be encompassed by the disclosed embodiments.

What is claimed is:

1. A coating composition comprising:
   at least one polymer comprising one or more cyanate groups; and
   at least one blocking agent contacting at least one of the one or more cyanate groups,
   wherein the at least one blocking agent is selected from the group consisting of an imidazole, a pyrrole, a pyrrolidine, a morpholine, a pyridine, a piperidine, an alkyl malonate ester, an acetoacetic ester, a cyanoacetic ester, and any combination thereof, and
   wherein the at least one blocking agent is configured to be removed by a stimulus to switch a portion of the coating composition that is exposed to the stimulus from a hydrophobic state to a hydrophilic state.

2. The composition of claim 1, wherein the at least one polymer comprises a polymer or a copolymer of an acrylate, a vinyl, a styrene, or any combination thereof.

3. The composition of claim 1, wherein the at least one polymer is a polymerization product of a monomeric unit selected from 2 hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate, 5-hydroxydecyl methacrylate, hydroxyethylcaprolactone acrylate, hydroxyethylcaprolactone methacrylate, hydroxypropylcarbamate acrylate, 2-hydroxy-3-phenoxypropyl acrylate, styrene, 2-vinylpyridine, 4-vinylpyridine, 2-vinylphenol, 4-vinylphenol, alpha-methylstyrene, vinyl acetate, vinyl propionate, vinyl butyrate, vinyl alcohol, vinyl chloride, vinyl fluoride, vinyl bromide, vinylidene chloride, vinylidene fluoride, methyl vinyl ether, ethyl vinyl ether, ethylene, propylene, butylene, methyl methacrylate, butyl methacrylate, methyl acrylate, butyl acrylate, hexyl methacrylate, hexyl acrylate, and any combination thereof.

4. The composition of claim 1, wherein the at least one polymer comprises a polymer of 2-[2-(2-methyl-acryloyloxy)-ethoxycarbonimidoyl]-malonic acid dimethyl ester, 2-methyl-acrylic acid 2-(4-methyl-imidazole-1-carboximidoyloxy)-ethyl ester, or a combination of both.

5. The composition of claim 1, further comprising a solvent, a pigment, a rheology modifier, a plasticizer, a surfactant, a coalescing agent, a crosslinking agent, or any combination thereof.

6. The composition of claim 1, further comprising a crosslinking agent comprising melamine, glycidyl methacrylate, 1-isocyanato-4-vinyl-benzene, 1-cyanato-4-vinyl-benzene, allyl methacrylate, vinyl methacrylate, 2-thioethyl methacrylate, cyanato-ethene, divinyl benzene, ethylene glycol dimethacrylate, propylene glycol dimethacrylate, polyethylene glycol dimethacrylate, toluene diisocyanate, 4,4'-methylenebis(phenyl isocyanate), isophorone diisocyanate, hexamethylene diisocyanate, melamine formaldehyde, ethylene glycol, glycerol, propylene glycol, hexamethylenediol, diethyl amine, hexamethylenediamine, dithiols, or any combination thereof.

7. The composition of claim 1, wherein the coating composition is a latex emulsion, a non-aqueous dispersion, or a powder.

8. The composition of claim 1, wherein the coating composition is a decorative coating, an industrial coating, a protective coating, a self-cleaning coating, or any combinations thereof.

9. The composition of claim 1, wherein the stimulus is water, air, gas, light, sunlight, heat, or any combination thereof.

10. A method for preparing a coating composition, the method comprising:
modifying a hydroxy-functional compound to form a cyanato ester;
contacting the cyanato ester with a blocking agent to form an ester monomer;
polymerizing the ester monomer to form a binder; and
preparing the coating composition with the binder,
wherein the blocking agent is configured to be removed by a stimulus to switch a portion of the coating composition that is exposed to the stimulus from a hydrophobic state to a hydrophilic state.

11. The method of claim 10, wherein modifying the hydroxy-functional compound comprises contacting the hydroxyl-functional compound with a base to form an intermediate compound, wherein the hydroxyl-functional compound is selected from 2-hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate, 5-hydroxydecyl methacrylate, hydroxyethyl-caprolactone acrylate, hydroxyethylcaprolactone methacrylate, hydroxypropylcarbamate acrylate, 2-hydroxy-3-phenoxypropyl acrylate, styrene, 2-vinylpyridine, 4-vinylpyridine, 2-vinylphenol, 4-vinylphenol, alpha-methylstyrene, vinyl acetate, vinyl propionate, vinyl butyrate, vinyl alcohol, vinyl chloride, vinyl fluoride, vinyl bromide, vinylidene chloride, vinylidene fluoride, methyl vinyl ether, ethyl vinyl ether, ethylene, propylene, butylene, methyl methacrylate, butyl methacrylate, methyl acrylate, butyl acrylate, hexyl methacrylate, hexyl acrylate, or derivatives of the foregoing, or any combination thereof.

12. The method of claim 11, wherein contacting the hydroxyl-functional compound with the base to form the intermediate compound comprises contacting the hydroxyl-functional compound with the base selected from lithium acetylide, butyl lithium, phenyl lithium, lithium phenylacetylide, dry hydroxide, triethyl amine, pyridine, imidazole, 1,5,7-triazabicyclo [4.4.0]dec-5-ene, quinuclidine, 1,4-diazabicyclo[2.2.2]octane, and any combination thereof.

13. The method of claim 11, wherein contacting the hydroxy-functional compound with the base comprises contacting the hydroxy-functional compound with the base for about 1 hour to about 4 hours at a temperature of about 0° C. to about 10° C.

14. The method of claim 11, further comprising contacting the intermediate compound with a cyanogen halide to form the cyanato ester.

15. The method of claim 14, wherein contacting the intermediate compound with the cyanogen halide comprises contacting the intermediate compound with the cyanogen halide for about 2 hours to about 15 hours at a temperature of about 20° C. to about 30° C.

16. The method of claim 10, wherein contacting the cyanato ester with the blocking agent comprises contacting the cyano ester with the blocking agent selected from an imidazole, a pyrrole, a pyrrolidine, a morpholine, a pyridine, a piperidine, an alkyl malonate ester, an acetoacetic ester, a cyanoacetic ester, and any combination thereof.

17. The method of claim 10, wherein contacting the cyanato ester with the blocking agent comprises mixing the blocking agent and the cyanato ester in a molar ratio of about 1:0.5 to about 1:1.5 for about 1 hour to about 6 hours at room temperature.

18. The method of claim 10, further comprising purifying the ester monomer before polymerization step.

19. The method of claim 10, wherein polymerizing the ester monomer comprises heating a mixture of water, an initiator, and a surfactant to a temperature of about 50° C. to about 95° C. and adding a solution of the ester monomer to the mixture.

20. The method of claim 19, wherein polymerizing the ester monomer comprises mixing the mixture and the ester monomer solution for a period of about 1 hour to about 12 hours.

21. The method of claim 10, further comprising preparing the coating composition with a solvent, a pigment, a rheology modifier, a plasticizer, a surfactant, a coalescing agent, a crosslinking agent, or any combination thereof.

22. The method of claim 10, further comprising preparing the coating composition with a crosslinking agent comprising melamine, glycidyl methacrylate, 1-isocyanato-4-vinyl-benzene, 1-cyanato-4-vinyl-benzene, allyl methacrylate, vinyl methacrylate, 2-thioethyl methacrylate, cyanato-ethene, divinyl benzene, ethylene glycol dimethacrylate, propylene glycol dimethacrylate, polyethylene glycol dimethacrylate, toluene diisocyanate, 4,4'-methylenebis(phenyl isocyanate), isophorone diisocyanate, hexamethylene diisocyanate, melamine formaldehyde, ethylene glycol, glycerol, propylene glycol, hexamethylenediol, diethyl amine, hexamethylenediamine, dithiols, or any combination thereof.

23. An article of manufacture comprising:
a coating covering at least a portion of the article, wherein the coating comprises at least one polymer comprising one or more cyanate groups; and
at least one blocking agent contacting at least one of the one or more cyanate groups,
wherein the at least one blocking agent is selected from the group consisting of an imidazole, a pyrrole, a pyrrolidine, a morpholine, a pyridine, a piperidine, an alkyl malonate ester, an acetoacetic ester, a cyanoacetic ester, and any combination thereof, and
wherein the at least one blocking agent is configured to be removed by a stimulus to switch a portion of the coating that is exposed to the stimulus from a hydrophobic state to a hydrophilic state.

24. The article of claim 23, wherein the at least one polymer comprises a polymer or a copolymer of an acrylate, a vinyl, a styrene, or any combination thereof.

25. The article of claim 23, wherein the at least one polymer is a polymerization product of a monomeric unit selected from 2 hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate, 5-hydroxydecyl methacrylate, hydroxyethylcaprolactone acrylate, hydroxyethylcaprolactone methacrylate, hydroxypropylcarbamate acrylate, 2-hydroxy-3-phenoxypropyl acrylate, styrene, 2-vinylpyridine, 4-vinylpyridine, 2-vinylphenol, 4-vinylphenol, alpha-methylstyrene, vinyl acetate, vinyl propionate, vinyl butyrate, vinyl alcohol, vinyl chloride, vinyl fluoride, vinyl bromide, vinylidene chloride, vinylidene fluoride, methyl vinyl ether, ethyl vinyl ether, ethylene, propylene, butylene, methyl methacrylate, butyl methacrylate, methyl acrylate, butyl acrylate, hexyl methacrylate, hexyl acrylate, and any combination thereof.

26. The article of claim 23, wherein the at least one polymer comprises a polymer of 2-[2-(2-methyl-acryloyloxy)-ethoxycarbonimidoyl]-malonic acid dimethyl ester, 2-methyl-acrylic acid 2-(4-methyl-imidazole-1-carboximidoyloxy)-ethyl ester, or a combination thereof.

27. The article of claim 23, wherein the coating further comprises a crosslinking agent comprising melamine, glycidyl methacrylate, 1-isocyanato-4-vinyl-benzene, 1-cyanato-4-vinyl-benzene, allyl methacrylate, vinyl methacrylate, 2-thioethyl methacrylate, cyanato-ethene, divinyl benzene, ethylene glycol dimethacrylate, propylene glycol dimethacrylate, polyethylene glycol dimethacrylate, toluene diisocyanate, 4,4'-methylenebis(phenyl isocyanate), isophorone diisocyanate, hexamethylene diisocyanate, melamine formaldehyde, ethylene glycol, glycerol, propylene glycol, hexamethylenediol, diethyl amine, hexamethylenediamine, dithiols, or any combination thereof.

28. The article of claim 23, wherein the coating is a decorative coating, an industrial coating, a protective coating, a self-cleaning coating, or any combination thereof.

29. The article of claim 23, wherein the stimulus is water, air, gas, light, sunlight, heat, or any combination thereof.

* * * * *

UNITED STATES PATENT AND TRADEMARK OFFICE
CERTIFICATE OF CORRECTION

PATENT NO. : 9,493,670 B2  
APPLICATION NO. : 14/785477  
DATED : November 15, 2016  
INVENTOR(S) : Carlson et al.

Page 1 of 1

It is certified that error appears in the above-identified patent and that said Letters Patent is hereby corrected as shown below:

In the Specification

In Column 1, Line 7, delete "§371" and insert -- § 371 --, therefor.

In Column 11, Line 18, delete "phrases at least one and" and insert -- phrases "at least one" and --, therefor.

In Column 11, Line 25, delete "one or more or at least one" and insert -- "one or more" or "at least one" --, therefor.

Signed and Sealed this  
Fourth Day of April, 2017

Michelle K. Lee  
*Director of the United States Patent and Trademark Office*